United States Patent
Sahinoglu et al.

(10) Patent No.: US 6,954,650 B2
(45) Date of Patent: Oct. 11, 2005

(54) DIRECTIVITY CHARACTERISTICS OF MOBILE TERMINALS

(75) Inventors: Zafer Sahinoglu, Clifton, NJ (US); Anthony Vetro, Short Hills, NJ (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 454 days.

(21) Appl. No.: 10/189,249

(22) Filed: Jul. 5, 2002

(65) Prior Publication Data

US 2004/0203866 A1 Oct. 14, 2004

Related U.S. Application Data

(63) Continuation-in-part of application No. 10/175,530, filed on Jun. 20, 2002.

(51) Int. Cl.$^7$ .................................. H04Q 7/20
(52) U.S. Cl. ................................. 455/456.6
(58) Field of Search .................. 455/414.3, 456.6, 455/456.1; 342/350; 701/200

(56) References Cited

U.S. PATENT DOCUMENTS

| | | | | |
|---|---|---|---|---|
| 5,416,477 A | * | 5/1995 | Shibata | 340/988 |
| 5,974,359 A | * | 10/1999 | Ohkubo | 701/214 |
| 6,611,687 B1 | * | 8/2003 | Clark et al. | 340/990 |
| 2002/0183073 A1 | * | 12/2002 | Morgand et al. | 455/456 |

* cited by examiner

*Primary Examiner*—Nguyen Vo
*Assistant Examiner*—Julie E. Stein
(74) *Attorney, Agent, or Firm*—Dirk Brinkman; Andrew J. Curtin

(57) ABSTRACT

A method determines mobility characteristics of a mobile terminal by measuring a first and second angular direction of travel of the mobile terminal at a first and second instant. The first angular direction is subtracted form the second angular direction to determine the directivity of the mobile terminal during an interval of time between the first instant and the second instant. The directivity, in terms of a mean, variance, or histogram can be used to classify the mobile terminal, and location-aware services can be adapted and delivered according to the classification.

20 Claims, 7 Drawing Sheets

$\theta_n \to \theta'_n$ $\theta_n \to 2\pi - \theta'_n$ $\theta_n \to \theta'_n + \pi$ $\theta_n \to \pi - \theta'_n$

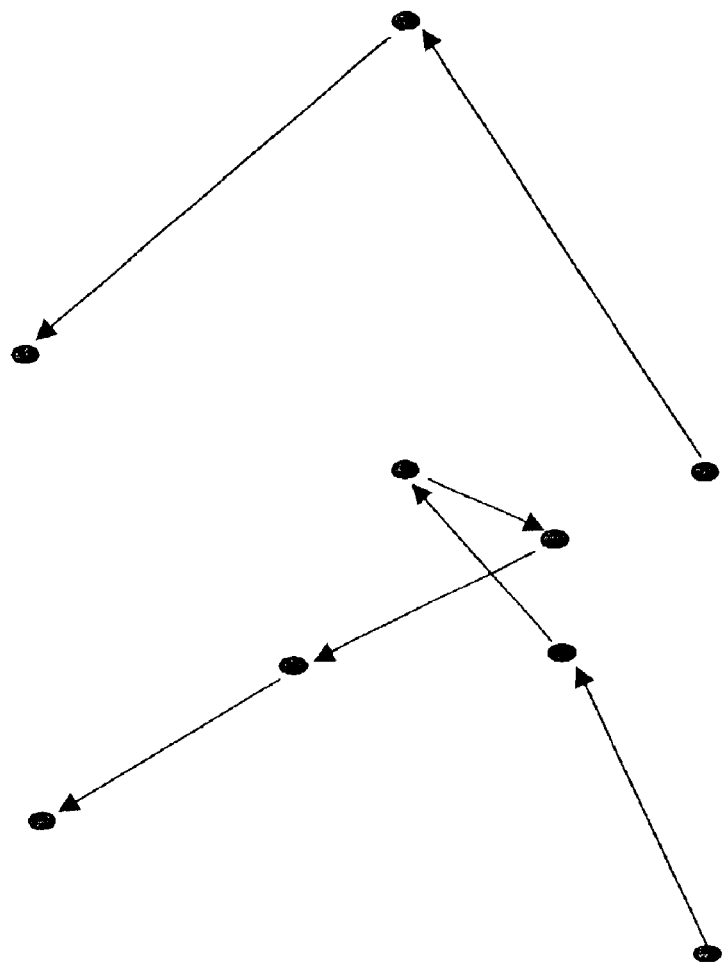
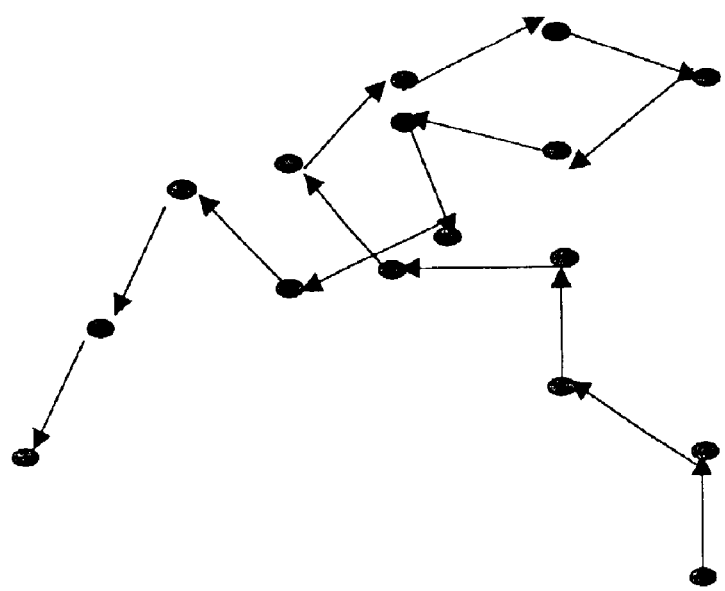
Fig. 6c
Fig. 6b
Fig. 6a

DIRECTIVITY CHARACTERISTICS OF MOBILE TERMINALS

CROSS-REFERENCE TO RELATED APPLICATION

This is a continuation-in-part of U.S. patent application Ser. No. 10/175,530 "Method and System for Classifying Mobile Terminals," filed by Sahinoglu on Jan. 20, 2002.

FIELD OF THE INVENTION

This invention relates generally to mobile terminals, and more particularly to determining travel patterns of mobile terminals in order to provide location-aware services.

BACKGROUND OF THE INVENTION

Prior art location-aware services adapt and deliver services and multimedia content according to locations of mobile terminal profiles of users. Users of mobile terminals can generally be classified as a pedestrian, highway vehicle driver, and urban vehicle driver, see Catovic et al., "Geolocation Updating Scheme For Location Aware Services in Wireless Networks," Proc. MobiCom'01, 2001.

In the prior art, terminal location is the primary metric used for location-aware services. Mobility can also consider average speed and speed variation, see Tekinay, "Modeling and Analysis of Mobile Cellular Networks with Highly Mobile Heterogeneous Traffic Sources," Ph.D. dissertation, School of Information Technology and Engineering, George Mason University, Virginia, 1994, Rose et al., "Location Uncertainty in Mobile Networks: A Theoretical Framework," IEEE Communications Magazine, February 1997, Lei et al., "Probability Criterion Based Location Tracking Approach for Mobility Management of Personal Communications Systems," IEEE 0-7803-4198-8/97 and Lei et al., "Wireless Subscriber Mobility Management Using Adaptive Individual Location Areas for PCS Systems," IEEE 0-7803-4788-9/98.

It is desired to obtain a more detailed understanding of travel patterns of mobile terminals than is available in the prior art.

SUMMARY OF THE INVENTION

A method determines mobility characteristics of a mobile terminal by measuring a first and second angular direction of travel of the mobile terminal at a first and second instant.

The first angular direction is subtracted from the second angular direction to determine the directivity of the mobile terminal during an interval of time between the first instant and the second instant.

The directivity, in terms of a mean, variance, or histogram can be used to classify the mobile terminal, and location-aware services can be adapted and delivered according to the classification.

BRIEF DESCRIPTION OF THE DRAWINGS

FIGS. 6a–c are graphs of update intervals; and

DETAILED DESCRIPTION OF PREFERRED EMBODIMENTS

The present invention provides a system and method for determining directivity characteristics of mobile terminals, and for customizing and delivering location-aware services (LAS) according to the mobile terminal's directivity characteristics.

Mobile terminals determine their locations, and a service manager polls this location information to determine the directivity characteristics so that an application service provider can adapt and deliver personalized and general multimedia services according to different directivity characteristics.

System Diagram

Figure 1:
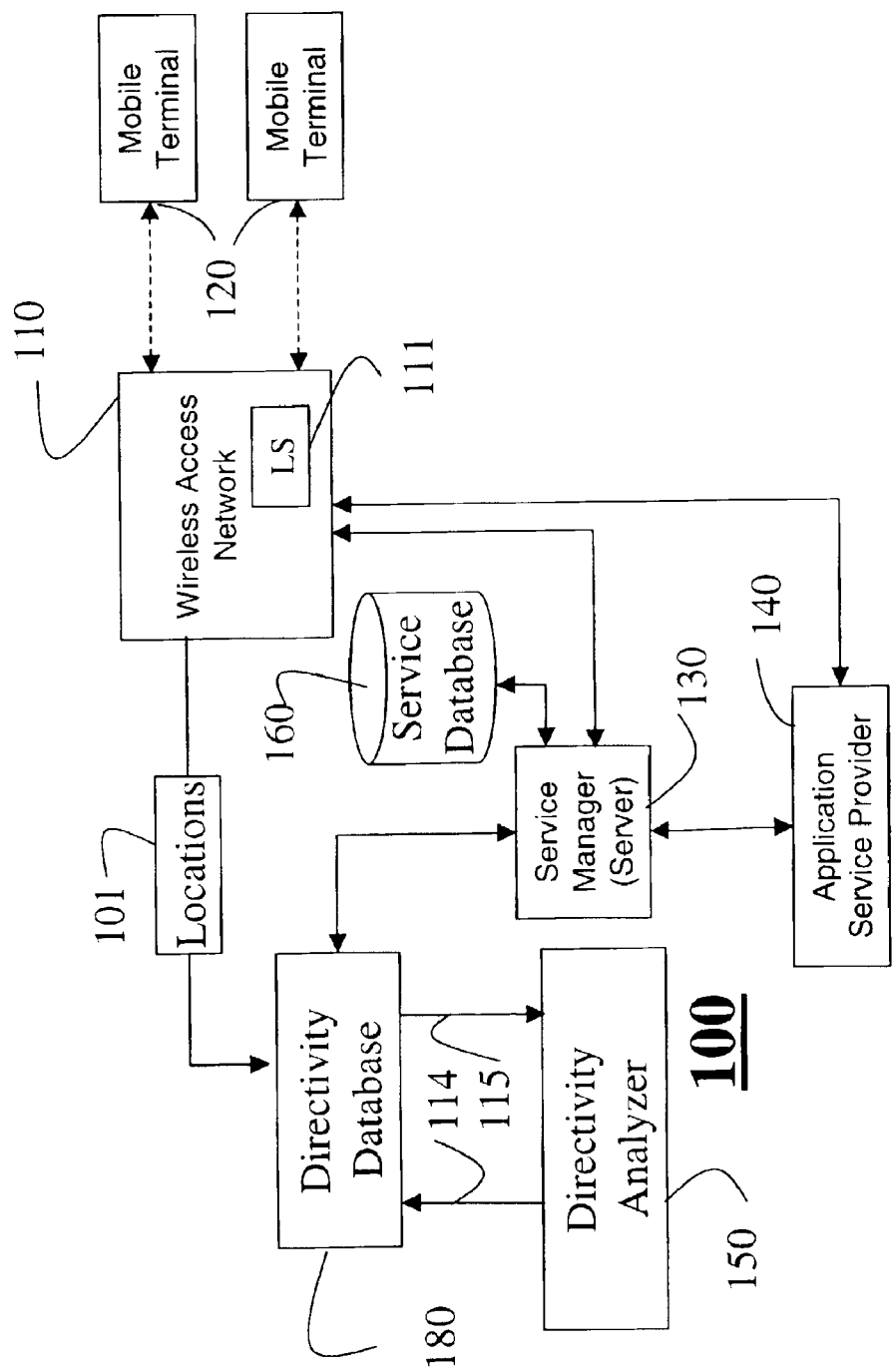
FIG. 1 is a block diagram of a system for determining directivity characteristics of mobile terminals according to the invention.

FIG. 1 shows a system 100 for determining directivity characteristics according to the invention. The system 100 includes mobile terminals (MT) 120, e.g., cellular phones and portable computing devices. The MTs 120 are connected to a service manager (server) 130 and an application service provider (ASP) 140 via an access network 110. The access network 110 can include wired and wireless portions. There can be multiple ASPs, e.g., local businesses in a particular locale. The services, e.g., multimedia content, to be provided can be stored in a service database 160.

Locations 101 of the mobile terminals 120 can be determined by using a location service (LS) 111, e.g., GPS, or see U.S. patent U.S. Pat. No. 5,970,414 issued to Bi et al. on Oct. 19, 1999, entitled, "Methodfor estimating a mobile-telephone's location." Typically, the location service 111 is part of the network 110.

Directivity Updates

Figure 2:
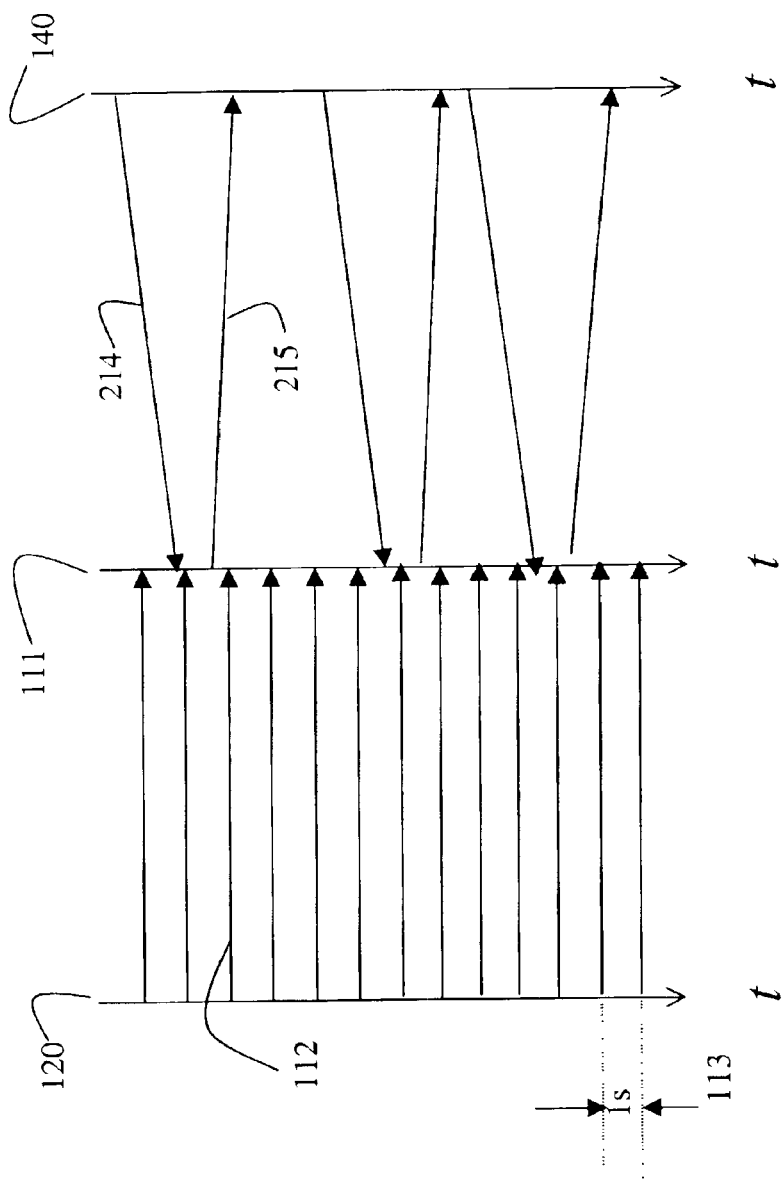
FIG. 2 is a timing diagram of directivity updates.

As shown in FIG. 2, the LS 111 periodically receives location coordinates 112 from the mobile terminals 120. These can be received periodically, e.g., at one second intervals 113. From the locations, other factors, such as speed and direction can be determined. FIG. 2 also shows periodic location requests 214 and location responses 215 made by the application service provider 140. This signaling is consistent with the mobile location protocol (MLP) specifications of the Location Interoperability Forum (LIF) Ltd. MLP is an industry standard to enable mobile network operators, applications and service providers to provide location-based services to mobile terminals. MLP defines a common interface to exchange location information between location-based applications and the wireless access network 110.

The mobile terminals measure 120 speed and location coordinates, and send this information 112 to the location server 111, either at periodic time intervals, or a-periodically. The LS 111 updates the database 180 with directivity and profile information. Upon arrival of a request 114 from the ASP 140, the LS 111 can search the database 180 for matching terminal directivity and profiles, and returns a response 115 with this information to the ASP 140.

A directivity analyzer 150, as described below, performs statistical signal processing on a history of directivity information stored in the database 180 to determine directivity characteristics of the MTs 120.

We define directivity as a mobility parameter that can be used to classify mobility profiles, and travel patterns. For example, the directivity characteristics can be used to classify different types of mobile terminal users, e.g., pedestrian, bicycler, urban driver, highway driver, or air traveler.

The directivity analyzer 150 a-periodically updates the mobility profiles in the database 180. The service manager 130 can poll this information, and customize the services 160 to be delivered according to the directivity characteristics. The service manager 130 informs the application service provider (ASP) 140 of any MTs within the ASP's 140 proximity, and MTs' 120 directivity characteristics. The ASP 140 performs the content adaptation and delivers customized services to the MTs 120.

Directivity

Figure 3:
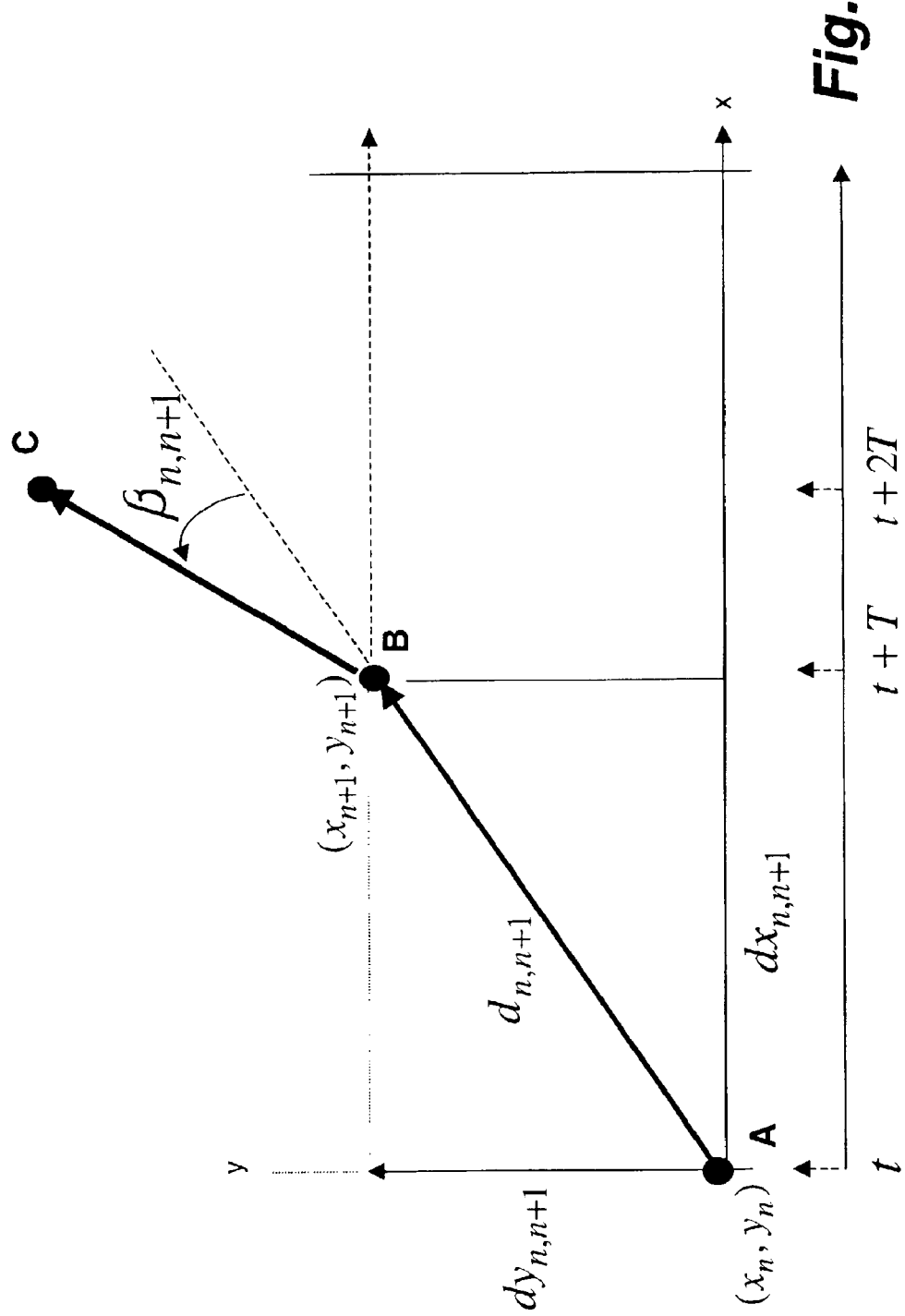
FIG. 3 is a graph of direction of travel of a mobile terminal.
Figure 4A:
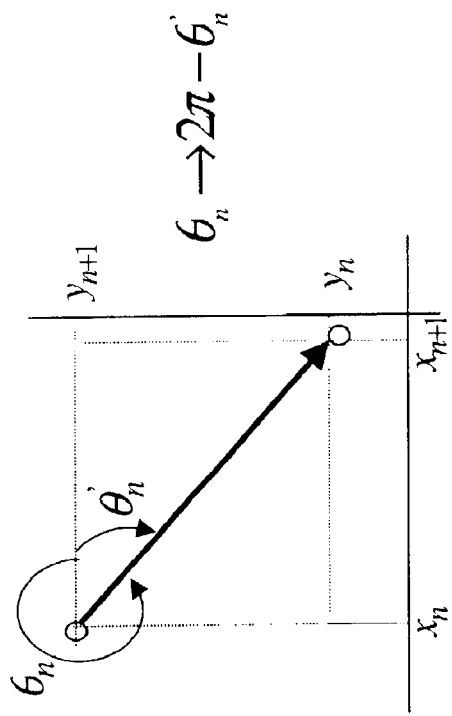
FIGS. 4a–d are graphs of travel in four quadrants of a Cartesian coordinate system.
Figure 4B:
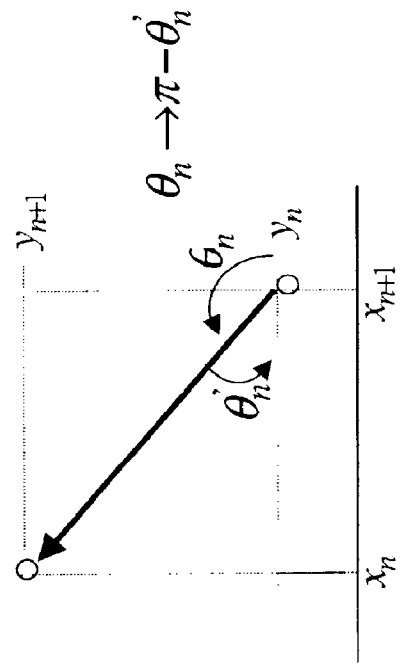
Figure 4C:
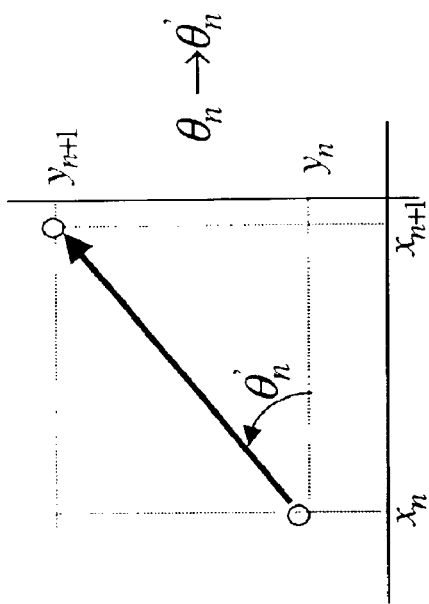
Figure 4D:
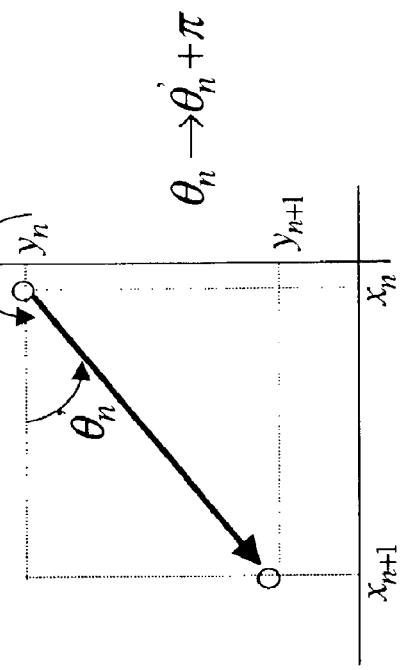

As shown in FIG. 3, directivity is defined as the amount of angular change in direction of a mobile terminal compared to a previous measurement. Directivity measurements vary from one time scale to another. In order to have a single directivity measurement, three coordinates and a time scale are required as shown in FIG. 3. A mobile terminal traverses a route A-B-C. The change in angular direction at time instant (n+1) with respect to a previous angular direction is the "directivity" at a given time scale.

Two consecutive coordinates $(x_n, y_n)$ A, and $(x_{n+1}, y_{n+1})$ B determine the angular direction of movement within (t, t+T) such that $$\theta_n = \arctan\frac{y_{n+1} - y_n}{x_{n+1} - x_n} = \arctan\frac{dy_{n,n+1}}{dx_{n,n+1}},$$

and within time interval (t+T, t+2T), the angular direction is $$\theta_{n+1} = \arctan\frac{dy_{n+1,n+2}}{dx_{n+1,n+2}}.$$

The directivity is determined as $\beta_{n,n+1} = \theta_{n+1} - \theta_n$ at time scale T.

As shown in FIGS. 4a–i d, the angular direction $\theta_n$ depends on the quadrant of the Cartesian coordinate system that contain the location, and the movement is directed.

A vector $\beta(T,N) = [ \ldots \beta_{n-1,n} \beta_{n,n+1} \beta_{n+1,n+2} \ldots ]$ is called the directivity vector, where $\beta_{i,i+1} = (\theta_{i+1} - \theta_i)$ per interval T.

The vector includes the last N directivity measurements at a time scale T. Knowing $\beta(T,N)$, the variation and other statistical values of directivity can be determined.

If the mobile terminal updates its location, speed and the angular direction 112 at time t=0, then the time $T_c$ that the mobile terminal leaves a service area can be determined in the case where there are no further change in the speed and the angular direction of the mobile terminal.

However, if the directivity is observed at time scale $T_c$, then the angular deviation of the current movement within $T_c$ time unit can be predicted and taken into consideration to determine the amount of time the MT will remain within the service area.

Variation in directivity changes slower for mobile terminals traveling at a high speed, for example, terminals in a car, plane, or train. While for slowly moving terminals, e.g., terminals carried by a walking or biking user, directivity changes faster. Directivity also reveals irregularities in a pattern of movement.

For example, let N denote the number of directivity measurements at time the scale T. Then, for a slow moving mobile terminal, the mean value E of the directivity measurements is close to zero, and the variance approaches $\pi$ for a high N, and small values of T, as expressed by:

$(N\uparrow)\wedge(T\to 0)$ $E\{\beta(T,N)\} \to 0$, and $\text{var}\{\beta(T,N)\} \to \pi$.

On the other hand, for a high-speed mobile terminal, the variance of the directivity measurements converges to zero:

$$\lim_{T\to 0}(Var(\beta(T, N))) \to 0.$$

Figure 5:
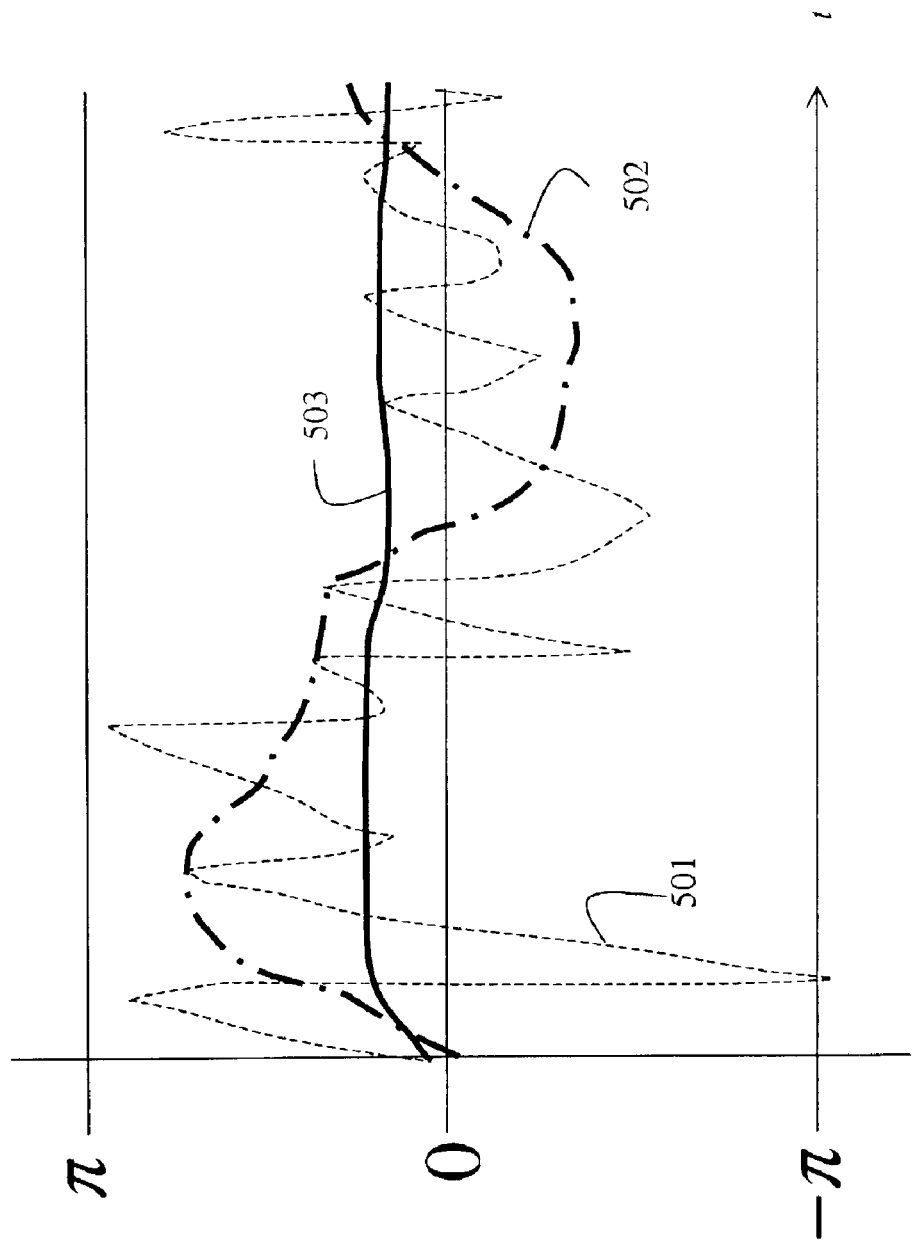
FIG. 5 is a graph of variation in directivity as a function of time.

FIG. 5 shows example patterns 501, 502, and 503 for slow speed (pedestrian,) medium speed (urban vehicular), and high speed (high way vehicular, train, plane) mobile terminals.

FIGS. 6a–6c show the impact of the time scale on directivity measurements, for T=1s, T=3s, and T=10s, respectively. Thus, a large N and small T is better for slow moving terminals, and the reverse for high speed terminals. Furthermore, frequency domain analysis can be used to distinguish different patterns of movement.

Although the above description is in terms of x and y coordinates or azimuth angle $\theta$, it should be understood, that z (height) coordinates can also be used. This information is readily available from GPS services. This introduces an elevation angle $\phi$. This not only allows one to distinguish a balloon passenger from a plane passenger, but also the vertical profile of the terrain over which the mobile terminal is passing.

Directivity Descriptor

A description of directivity is needed to efficiently store, process and communicate the raw data, i.e., the directivity vector $\beta(T,N)$. The description should be compact and should accurately represent the entire set of data samples during a given time period, and at a given time scale.

A single directivity measurement requires knowledge of three location coordinates and the time interval (T) between two consecutive location updates. The directivity can be used to analyze mobility characteristics from past trajectory information and to classify mobility profiles. Directivity can also be used to predict future mobility behaviors of mobile terminals. However, a single directivity value is not adequate. Therefore, to extract mobility profile information and to predict a future mobility path of the MT, a history of directivity is needed.

Mean and Variance

In order to construct a directivity vector from the history of directivity measurements, the size of the vector, that is the number of directivity measurements (N), must be given. First and second order statistical properties, such as the mean and variance, of the directivity vector are appropriate descriptions of the changes in the mobility pattern.

For instance, assume that the directivity vector includes twenty consecutive measurements taken at five second intervals, and each measurement value is 2. This means that the MT is changing its angular direction by 2° every five seconds. During the previous hundred seconds, the total angular change in the angular direction of the MT was 40°. In this example, the variance of the directivity vector is zero, and the mean is 2° per five seconds. This indicates a high probability that the MT will make another 2° change in its angular direction within the next five seconds.

Histogram

A histogram of the directivity vector is also a good description of the directivity vector. The histogram reveals important information about the mobility patterns in a concise way. The histogram can capture information related to the degree and frequency of directional changes. Therefore, the histogram is a good descriptor for classifying different mobility patterns.

The histogram contains M bins. The i-th bin covers a range from $i*\pi/M$ to $(i+1)*\pi/M$ radians, where i takes values from 0 to M−1. Given a duration of time during which the MT travels and a given time scale, the histogram specifies the frequency of angular changes corresponding to each bin. The value in each bin can be normalized according to the size of the directivity vector, N. Smaller values of M provide a more concise representation of the directivity vector. However, if the value of M is too small, the histogram descriptor is less accurate. To perform mobility classification based on the histogram, an appropriate value of M is selected. Values of M between 16 and 32 provide a sufficient trade-off between conciseness and accuracy.

Applications

The directivity descriptor is a better measure for classifying distinct mobility characteristics than just location and speed, as in the prior art. The variance of the directivity distinguishes different mobility profiles such as pedestrian, highway vehicular, plane, train, etc. Pedestrian movement, for example, a shopper, can be erratic at small time scales with high directional changes from 0 to $\pi$. On the other hand, a fast moving MT, such as a terminal on a train or plane has small directional changes over time. Although speed can be used as a metric to distinguish pedestrian type of slowly moving MTs from fast moving MTs. However, using a directivity descriptor enables a finer classification of each of these mobility profiles.

For instance, measuring directivity at small time scales helps to distinguish a shopper from a sight-seeing tourist, which would otherwise both be classified as pedestrians, although potentially interested in quite different services. The directivity measure recognizes this difference.

Tracking location update intervals (LUI) of the MT provides complementary information to that of the directivity. Speed, direction and directivity of the MT affect the location update times of the MT upon crossing service boundaries. However, LUIs give similar high level distinguishing information of different mobility profiles as speed. By also using directivity, a finer classification can be obtained.

Figure 7:
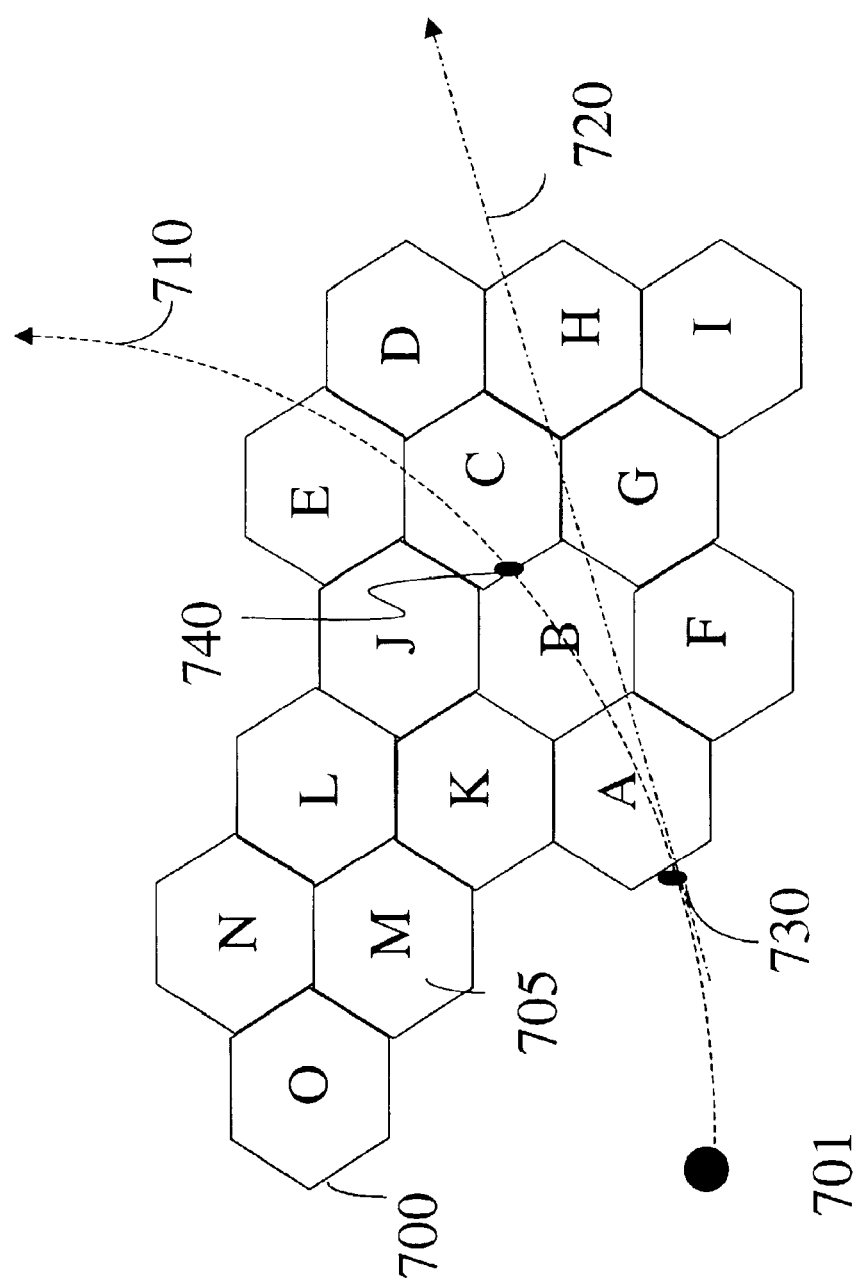
FIG. 7 is a schematic of directivity in a cellular network.

FIG. 7 illustrates the movement of a mobile terminal (MT) 701 within a cellular network 700. Each letter denotes a coverage area for a given cell 705. Based on the instantaneous direction and speed measurement taken at a coordinate point 730, the MT 701 is expected to follow a linear path 720 through cells A-B-C-H. However, considering directivity measurements taken at point 730, and confirmed at point 740, show that the actual non-linear path 710 that the MT 701 travels traverses cells A-B-C-E.

Thus, previous and instantaneous directivity measurements decrease the error in the prediction of the actual path. In other words, a better trajectory prediction can help to manage system resources more efficiently. Therefore, directivity is a useful attribute for more accurate prediction of the rate of diffusion in terms of the number of mobile terminals moving from one cell to another. It can also be used to predict the number of MTs in a given area, i.e., to predict the density of MT's in a given area over time.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining mobility characteristics of a mobile terminal, comprising:

measuring a first angular direction of travel of a mobile terminal at a first instant;

measuring a second an angular direction of travel of the mobile terminal at a second instant; and subtracting the first angular direction from the second angular direction to determine a directivity of the mobile terminal during an interval of time between the first instant and the second instant, wherein the first angular direction is $\theta_n$, the second angular direction is $\theta_{n+1}$, the first instant is t, the second instant is t+T, the interval of time is T, and a directivity element is $\beta_{n,n+1} = \theta_{n+1} - \theta_n$; and wherein a directivity vector stores N directivity elements of the mobile terminal as $\underline{\beta}(T,N) = [ \ldots \beta_{n-1,n}\beta_{n,n+1}\beta_{n+1,n+2} \ldots ]$, where $\beta_{i,i+1} = (\theta_{i+1} - \theta_i)$ per interval of time T.

2. The method of claim 1 further comprising:

classifying the mobile terminal according to the directivity.

3. The method of claim 1 further comprising:

determining a directivity descriptor of the mobile terminal according to the directivity vector.

4. The method of claim 3 wherein the directivity descriptor is a mean of the directivity elements.

5. The method of claim 3 wherein the directivity descriptor is a variance of the directivity elements.

6. The method of claim 3 wherein the directivity descriptor includes a mean and variance of the directivity elements.

7. The method of claim 3 further comprising:

assigning the directivity elements to bins of a histogram to determine the directivity descriptor.

8. The method of claim 3 further comprising:

classifying the mobile terminal according to the directivity descriptor.

9. The method of claim 3 further comprising:

adapting and delivering location-aware services to the mobile terminal according to the directivity descriptor.

10. The method of claim 9 wherein the location-aware services include multimedia content.

11. The method of claim 2 further comprising:

adapting and delivering location-aware services according to the classification of the mobile terminal.

12. The method of claim 2 wherein the mobile terminal is classified as pedestrian, urban driver, or highway driver.

13. The method of claim 1 wherein a frequency of obtaining the directivity depends on a speed of the mobile terminal.

14. The method of claim 1 wherein a first location $(x_n, y_n)$ is at the first instant t, and second location is at the second instant $t+T(x_{n+1}, y_{n+1})$ so that $$\theta_n = \arctan\frac{y_{n+1} - y_n}{x_{n+1} - x_n} = \arctan\frac{dy_{n,n+1}}{dx_{n,n+1}},$$

and $$\theta_{n+1} = \arctan\frac{dy_{n+1,n+2}}{dx_{n+1,n+2}}.$$

15. The method of claim 1 wherein the directivity of the mobile terminal indicates a pattern of movement over time.

16. The method of claim 1 wherein the directivity includes an azimuth angle $\theta$ and an elevation angle $\phi$.

17. The method of claim 1 further comprising:

measuring a corresponding directivity for each of a plurality of mobile terminals; and predicting movement of the mobile terminals within a cellular network based on the corresponding directivities of the plurality of mobile terminals.

18. The method of claim 17 wherein the predicted movement includes a diffusion rate of the mobile terminals in the cellular network.

19. The method of claim 17 wherein the predicted movement indicates a density of the mobile terminals in the cellular network.

20. The method of claim 1 wherein the directivity determines a non-linear path of the mobile terminal.

* * * * *